US012248535B2

(12) United States Patent
Bondugula et al.

(10) Patent No.: US 12,248,535 B2
(45) Date of Patent: Mar. 11, 2025

(54) REDUCING FALSE DETECTIONS FOR NIGHT VISION CAMERAS

(71) Applicant: ObjectVideo Labs, LLC, Tysons, VA (US)

(72) Inventors: Sravanthi Bondugula, Vienna, VA (US); Gang Qian, McLean, VA (US); Sung Chun Lee, Fairfax, VA (US); Sima Taheri, McLean, VA (US); Allison Beach, Leesburg, VA (US)

(73) Assignee: ObjectVideo Labs, LLC, Tysons, VA (US)

( * ) Notice: Subject to any disclaimer, the term of this patent is extended or adjusted under 35 U.S.C. 154(b) by 709 days.

(21) Appl. No.: 17/472,800

(22) Filed: Sep. 13, 2021

(65) Prior Publication Data

US 2022/0101066 A1    Mar. 31, 2022

Related U.S. Application Data

(60) Provisional application No. 63/084,769, filed on Sep. 29, 2020.

(51) Int. Cl.
*G06F 18/21* (2023.01)
*G06F 18/214* (2023.01)
(Continued)

(52) U.S. Cl.
CPC ...... *G06F 18/2193* (2023.01); *G06F 18/2148* (2023.01); *G06F 18/2431* (2023.01); *G06N 3/08* (2013.01); *G06V 20/54* (2022.01)

(58) Field of Classification Search
CPC ............. G06F 18/2193; G06F 18/2148; G06F 18/2431; G06N 3/08; G06V 20/54
See application file for complete search history.

(56) References Cited

U.S. PATENT DOCUMENTS

| | | | |
|---|---|---|---|
| 7,227,893 B1 * | 6/2007 | Srinivasa | G08B 13/19602 348/169 |
| 2010/0037059 A1 * | 2/2010 | Sun | H04N 1/32144 713/176 |

(Continued)

OTHER PUBLICATIONS caffe.berkeleyvision.org [online], "caffe:: InfogainLossLayer< Dtype > Class Template Reference," Aug. 3, 2017, retrieved on Mar. 2, 2022, retrieved from URL <http://caffe.berkeleyvision.org/doxygen/classcaffe_1_1InfogainLossLayer.html>, 9 pages.

(Continued)

*Primary Examiner* — Qun Shen
(74) *Attorney, Agent, or Firm* — Fish & Richardson P.C.

(57) ABSTRACT

Methods, systems, and apparatus, including computer programs encoded on computer storage media, for reducing camera false detections. One of the methods includes providing, to a neural network of an image classifier that is trained to detect objects of two or more classification types, a feature vector for a respective training image; receiving, from the neural network, an output vector that indicates, for each of the two or more classification types, a likelihood that the respective training image depicts an object of the corresponding classification type; accessing, from two or more ground truth vectors each for one of the two or more classification types, a ground truth vector for the classification type of an object depicted in the training image; and adjusting one or more weights in the neural network using the output vector and the ground truth vector; and storing, in a memory, the image classifier.

21 Claims, 5 Drawing Sheets

(51) Int. Cl.
    *G06F 18/2431*   (2023.01)
    *G06N 3/08*      (2023.01)
    *G06V 20/54*     (2022.01)

(56) References Cited

U.S. PATENT DOCUMENTS

| | | | | |
|---|---|---|---|---|
| 2014/0270551 | A1* | 9/2014 | Baranowski | G06F 18/214 |
| | | | | 382/226 |
| 2016/0335521 | A1* | 11/2016 | Jiang | G06F 18/2431 |
| 2017/0024619 | A1* | 1/2017 | Wu | G06V 20/47 |
| 2017/0364766 | A1* | 12/2017 | Das | G06V 20/20 |
| 2018/0107902 | A1* | 4/2018 | Yang | G06N 3/084 |
| 2018/0181881 | A1* | 6/2018 | Du | G06V 10/82 |
| 2019/0188524 | A1* | 6/2019 | He | G06F 18/28 |
| 2019/0213426 | A1* | 7/2019 | Chen | G06T 7/20 |
| 2020/0160050 | A1* | 5/2020 | Bhotika | G06V 30/414 |
| 2020/0242479 | A1* | 7/2020 | Kim | G06V 20/41 |

OTHER PUBLICATIONS

Christopher5106.github.io [online], "About loss functions, regularization and joint losses : multinomial logistic, cross entropy, square errors, euclidian, hinge, Crammer and Singer, one versus all, squared hinge, absolute value, infogain, L1 / L2—Frobenius / L2,1 norms, connectionist temporal classification loss," Sep. 16, 2016, retrieved on Mar. 2, 2022, retrieved from URL <http://christopher5106.github.io/deep/learning/2016/09/16/about-loss-functions-multinomial-logistic-logarithm-cross-entropy-square-errors-euclidian-absolute-frobenius-hinge.html>, 10 pages.

GitHub.com [online], "Caffe: a fast open framework for deep learning," available on or before Apr. 14, 2020, via Internet Archive: Wayback Machine URL <http://web.archive.org/web/20200415023640/https://github.com/BVLC/caffe>, retrieved on May 18, 2020, retrieved from URL <https://github.com/BVLC/caffe>, 3 pages.

Wikipedia.com [online], "Caffe (software)," Sep. 2, 2021, retrieved on Mar. 2, 2022, retrieved from URL <https://en.wikipedia.org/w/index.php?title=Caffe_(software)&oldid=1041997104>, 3 pages.

* cited by examiner

400

Provide, to a neural network of an image classifier that is trained to detect objects of the two or more classification types, a feature vector for a respective training image    402

Receive, from the neural network, an output vector that indicates, for each of the two or more classification types, a likelihood that the respective training image depicts an object of the corresponding classification type    404

Access, from two or more ground truth vectors each for one of the two or more classification types, a ground truth vector for the classification type of an object depicted in the respective training image    406

Adjust one or more weights in the neural network using a combination of the output vector and the ground truth vector for the classification type of the objected depicted in the respective training image    408

Store, in a memory, the image classifier that includes the neural network for use by a camera to classify objects detected in one or more images captured by the camera    410

FIG. 4

REDUCING FALSE DETECTIONS FOR NIGHT VISION CAMERAS

CROSS-REFERENCE TO RELATED APPLICATION

This application claims the benefit of U.S. Provisional Application No. 63/084,769, filed on Sep. 29, 2020, the contents of which are incorporated by reference herein.

BACKGROUND

Properties can be equipped with monitoring systems, e.g., security systems, that include sensors and connected system components. Some residential-based monitoring systems include cameras. Cameras can use computer vision technology to analyze images to detect objects depicted in the images.

SUMMARY

Cameras can employ image analytics for monitoring a residential or a business property. These cameras can operate around the clock, e.g., both day and night to detect any activity caused by an object of interest, e.g., human, animal, or vehicle in and around the property, and alert the owner.

Additionally or alternatively, depending on the class of objects depicted in the images, a system can determine whether to perform an automated action such as turning on lights at the property. For example, the system can turn on lights upon detecting a moving person depicted in an image captured by the camera. In contrast, when the system detects a tree or a spider web depicted in an image, which may be moving due to wind, the system can determine to not provide an alert, not to perform any automated action like turning on lights, or both.

While detecting events at daytime can be achieved with reasonable accuracy using a combination of low-cost solutions like background modeling with optimized deep learning-based classifiers, detection at night can fail frequently with a large drop in accuracy. Detection at night is particularly challenging due to conditions such as low illumination, low contrast, sudden illumination changes (e.g., sudden change in lighting as the vehicle enters the driveway), rain streaks, or spider or spider web movements on the cameras, both of which can have object like movements, shapes, or both. In these challenging conditions at night, a system can have a higher likelihood of producing false classifications even when a state-of-the-art deep learning-based classification technique is deployed.

In general, one innovative aspect of the subject matter described in this specification relates to reducing camera false detections, and can be embodied in methods that include the actions of, for each of a plurality of training images each of which are associated with a classification type from two or more classification types, the plurality of training images including at least one image for each of the two or more classification types: providing, to a neural network of an image classifier that is trained to detect objects of the two or more classification types, a feature vector for the respective training image; receiving, from the neural network, an output vector that indicates, for each of the two or more classification types, a likelihood that the respective training image depicts an object of the corresponding classification type; accessing, from two or more ground truth vectors each for one of the two or more classification types, a ground truth vector for the classification type of an object depicted in the respective training image; and adjusting one or more weights in the neural network using a combination of the output vector and the ground truth vector for the classification type of the objected depicted in the respective training image; and storing, in a memory, the image classifier that includes the neural network for use by a camera to classify objects detected in one or more images captured by the camera.

In general, one innovative aspect of the subject matter described in this specification relates to reducing camera false detections, and can be embodied in methods that include the actions of providing, to a neural network being trained to detect objects of interest, a training image that depicts an object; receiving, from the neural network, an indication that the object is a first class of object of non-interest; determining that the object is a second class of object of non-interest and was incorrectly classified by the neural network as the first class of object of non-interest; and weighting the neural network towards correctly classifying the object as the second class of object of non-interest.

Other embodiments of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations, a ground truth vector for an image can represent a ground truth label for the image.

In some implementations, each ground truth vector can include a value for each of the two or more classification types. Each ground truth vector can include a highest value for the classification type from the two or more classification types of the object depicted in a corresponding image. Adjusting the one or more weights in the neural network can include combining, for each of the values in the ground truth vector, the respective value from the ground truth vector with a corresponding value from the output vector to generate combined values; generating a training value using the combined values; and adjusting the one or more weights in the neural network using the training value.

In some implementations, each of the two or more classification types can be a classification for either an object of interest or not an object of interest. A particular ground truth vector from the two or more ground truth vectors can include, for each of the two or more classification types, two or more non-negative values each of which are less than one and the sum of which equals one. Multiple, e.g., each, of the two or more non-negative values in the particular ground truth vector can be the same value.

In some implementations, storing, in a memory, the image classifier can include combining the neural network with a binary classifier layer to generate a binary neural network trained to receive a feature vector for an image as input and output a value that indicates whether an object depicted in the image is an object of interest or is not an object of interest; and storing, in a memory, the image classifier that includes the binary neural network for use by an camera to classify objects detected in one or more images captured by the camera.

In some implementations, the method can include providing the image classifier to a camera for use by the camera classifying objects detected in one or more images captured by the camera. Providing the image classifier to the camera can include providing an infrared image classifier that includes the neural network to an infrared camera.

In some implementations, accessing the ground truth vector can include accessing, from three or more ground truth vectors each for one of three or more classification types, the ground truth vector for the classification type of an object depicted in the respective training image. The three or more classification types can include five classification types including a background classification, a spider web classification, a human classification, an animal classification, and a vehicle classification. Accessing the ground truth vector can include accessing, from five ground truth vectors each for one of the five classification types, the ground truth vector for the classification type of an object depicted in the respective training image.

In some implementations, the method can include storing the weighted neural network in memory for use by a camera in classifying one or more images captured by the camera. The neural network can be being trained to detect objects of three or more classes including the first class of object of non-interest, the second class of object of non-interest, and a third class of object of interest. The neural network can be an infrared image classifier.

In some implementations, the method can include selecting a first weight with a first sign based on the first class and the second class both being objects of non-interest; determining, for a second object depicted in a second training image that the neural network incorrectly classified as a third class, i) that the second object is a fourth class and i) one of the third class and the fourth class is a class of object of non-interest and the other of the third class and the fourth class is a class of object of interest; selecting a second weight with a second, different sign based on one of the third class and the fourth class is a class of object of non-interest and the other of the third class and the fourth class is a class of object of interest; and weighting the neural network towards correctly classifying the second object as the fourth class using the second weight. Weighting the neural network towards correctly classifying the object as the second class of object of non-interest can use the first weight.

In some implementations, weighting the neural network can include determining a ground truth vector for the second class of object of non-interest; generating a training value by combining the ground truth vector with an output vector received from the neural network that includes the indication that the object is the first class of object of non-interest; and updating one or more weights in the neural network using the training value.

In some implementations, the method can include creating an image classifier by adding a binary classifier layer to an output layer of the neural network; and transmitting the image classifier to a camera for use classifying an image as depicting an object of interest or an object of non-interest.

The subject matter described in this specification can be implemented in various embodiments and may result in one or more of the following advantages. In some implementations, the systems and methods described in this specification can reduce false classifications. The systems and methods can reduce false classifications using ground truth vectors and vectors output by a neural network, e.g., by combining the two vectors. In some implementations, the systems and methods described in this specification can reduce false classifications by learning for noisy classes separately and/or balancing recall and precision of classification between objects of interest and non-objects of interest using different class weights during training for the different classifications.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 is a flow diagram of a process for training an image classifier.

Like reference numbers and designations in the various drawings indicate like elements.

DETAILED DESCRIPTION

Figure 1:
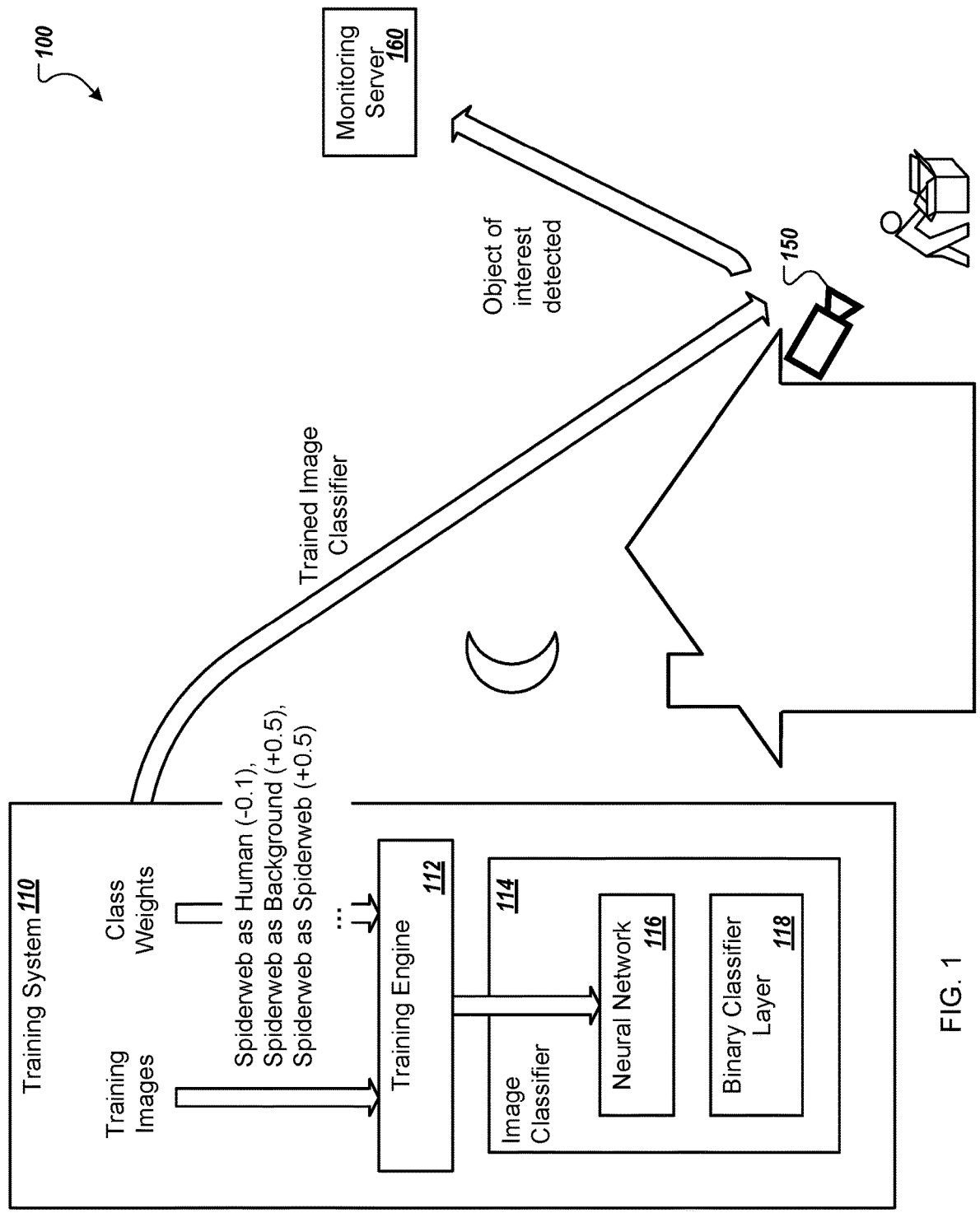
FIG. 1 is a block diagram of an example environment that detects for objects.

FIG. 1 is a block diagram of an example environment 100 that detects objects. The environment 100 includes a training system 110, a camera 150, and a monitoring server 160. The training system 110 provides a trained image classifier to the camera 150, and the camera 150 uses the trained image classifier to detect objects of interest and provide indications to the monitoring server 160 that indicate that objects of interest were detected. In some implementations, the training system 110 may be included in the monitoring server 160.

The training system 110 includes a training engine 112 that trains an image classifier 120 to generate a trained image classifier. The image classifier 120 can classify whether or not an image includes an object of interest. The image classifier 120 includes a neural network 122 and a binary classifier layer 124.

The camera 150 can receive the trained image classifier from the training system 110 and then detect objects of interest with the trained image classifier. The camera 150 may provide indications to the monitoring server 160 when objects of interest are detected, and otherwise not provide indications that objects of interest were not detected.

For instance, the camera 150 can use the trained image classifier to analyze an image captured by the camera 150. The trained image classifier can generate output that indicates whether the captured image likely depicts an object of interest. When the camera 150 receives, from the trained image classifier, output that indicates that a captured image likely depicts an object of interest, the camera 150 can send a message to the monitoring server 160 that includes data about the object of interest. When the camera 150 receives, from the trained image classifier, output that indicates that a captured image likely does not depict an object of interest, the camera 150 can determine to skip sending a message to the monitoring server 160.

Figure 2:
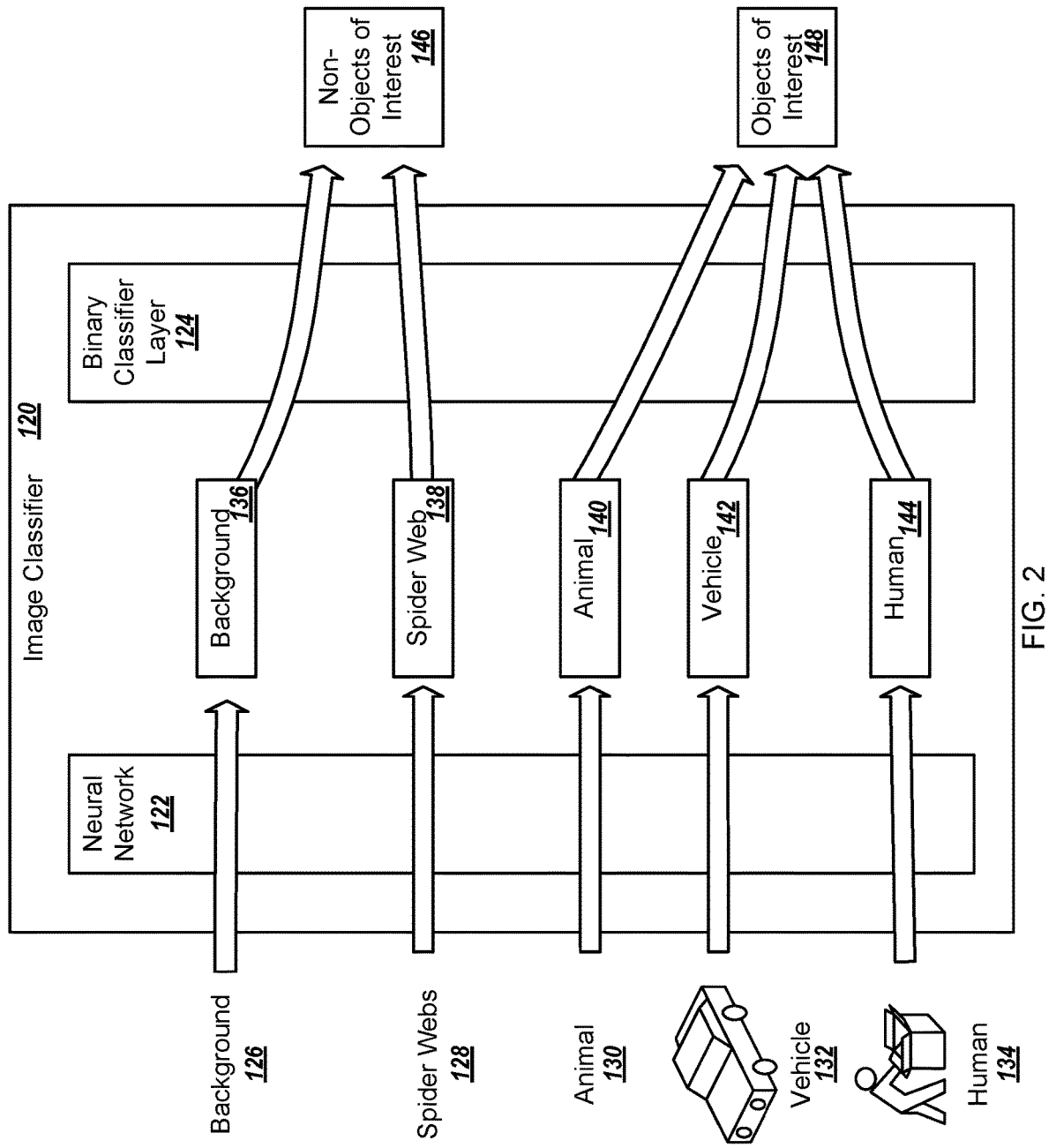
FIG. 2 is a block diagram of an image classifier.

FIG. 2 is a block diagram of an image classifier 120. The image classifier 120 can be any appropriate type of image classifier, such as an infrared image classifier, a visible spectrum image classifier, or a combination of both. The image classifier 120 can be the image classifier 114 from FIG. 1.

The image classifier 120 includes the neural network 122, e.g., the neural network 116, and the binary classifier layer 124, e.g., the binary classifier layer 118. The neural network 122 receives, as input, a representation of an image and provides outputs for different classes of classification. Some examples of input include background content 126, e.g., a tree or a bush, spider webs 128, animals 130, vehicles 132, and humans 134.

In response to receiving the input, the neural network 122 can classify an image as including background 136, a spider web 138, a vehicle 142, a human 144, or an animal 140, respectively given the input data. In some examples, the neural network 122 can include one or more additional classifications, such as plant, water, or both.

A background classification can be used to classify objects other than the other objects for which the neural network 122 is trained. For example, when the neural network 122 is trained to detect vehicles, animals, and humans, the neural network 122 can use the background classification for any other objects. When the neural network 122 is trained to detect vehicles, animals, humans, and spider webs, the neural network 122 can use, e.g., be trained to use, the background classification for any other objects.

Sometimes an image may depict multiple objects that belong to different classifications for which the neural network 122 is trained. In these examples, the neural network 122 can classify the image as depicting objects in multiple different classifications or a single, primary classification. The primary classification can be for an object that is depicted most prominently in the image; a classification for an object of interest, e.g., animal, human, or vehicle, and not a classification for a non-object of interest, e.g., background or a spider web, to the extent that the neural network 122 determines that the image likely depicts an object of interest; or another appropriate single classification.

While a neural network for classifying an image as being an object of interest versus a non-object of interest may be trained, such a neural network may not work well due to the challenge of trying to capture the combined distribution of multiple object of interest classes in one single class. For instance, such a neural network can have a low accuracy, for objects of interest, non-objects of interest, or both.

Accordingly, the neural network 122 classifies the image between multiple different background classes because a generic background classifier may not accurately capture high variation, e.g., between objects of different types, in the background class. Creating a separate class for spider webs, in addition to the other classes for objects of interest, may distribute data between background classes and result in each background class having less noisy data, e.g., a higher accuracy. For example, a classifier trained to only detect spider webs may be more accurate at detecting spider webs than a classifier that is trained to detect both spider webs and background, e.g., and output a single value that indicates whether an image likely depicts either a spider web or background.

Additionally or alternatively, the neural network 122 can be used only to classify images captured while a camera is in a night mode and a separate different neural network used to classify while the camera is not in the night mode, e.g., a day mode. The night mode may be a mode in which the camera generates images that represent detected infrared light and the day mode may be a mode in which the camera generates images that represent detected light other than infrared light, e.g., visible spectrum light.

Separate classifiers may be used for day mode and night mode as a generic classifier alone may not perform well at classifying events in all varying conditions. This may be due to insufficient number of hard samples mimicking the tough conditions in night mode present in training data. Even with training data covering a wide variety of conditions, a generic classifier might not learn to classify well in both day and night due to large imbalance and variance in the training data. Accordingly, the image classifier 120 may be used when a camera is in night mode and a different image classifier, e.g., a visible spectrum image classifier, may be used when a camera is not in night mode, e.g., when the camera is in day mode.

The binary classifier layer 124 receives the output of the neural network 122 and outputs a binary indication of whether an object of interest is shown in the image. For example, the binary classifier layer 124 may receive a vector of [0, 1, 0, 0, 0], where going from left to right in the vector, the first element is a binary indication of whether the image is of background 136, the second element is a binary indication of whether the image is of a human 144, the third element is binary indication of whether the image is of an animal 140, the fourth element is a binary indication of whether the image is of a vehicle 142, and the fifth element is binary indication of whether the image is of a spider web 138. In some implementations, the values in the vector can represent different orders for the classifications 136-144.

In the example, the binary classifier layer 124 may then output an indication whether the image does not depict an object of interest 146 or depicts an object of interest 148. The indication can be a binary output, e.g., with one indicating that the image depicts an object of interest 148 and zero indicating that the image does not depict an object of interest 146, such as a non-object of interest. The binary output can be a final classification type.

In another example, the binary classifier layer 124 may receive a vector of [1, 0, 0, 0, 0], and output a binary indication that the image is not of an object of interest. This can occur when the input image depicts a tree or a bush or some other type of background content 126.

The binary classifier layer 124 may output that the image is of an object of interest 148 if the neural network 122 outputs data that indicates that a human 144, an animal 140, or a vehicle 142 was detected in an input image. The binary classifier layer 124 may output that the image does not depict an object of interest 146, or is not of an object of interest, if the neural network 122 outputs data that indicates that the image is of background content 136 or a spider web 138 (or a spider).

In training the neural network 122, misclassifications among classes of objects of interest may be permissible, and misclassifications among classes of non-objects of interest may be permissible, but misclassifications of objects of interest as non-objects of interest or vice versa may be penalized, e.g., by the training system 110. For example, the camera 150 may provide the monitoring server 160 an image when an object of interest is detected irrespective of the class of object of interest that was detected. The camera 150 might not provide the monitoring server 160 an image when the image does not depict an object of interest, e.g., when only non-objects of interest are detected, irrespective of the classes of the non-objects of interest that might be detected in the image. Therefore, the neural network 122 is trained to be a multi-class classifier and the binary classifier layer 124 can enable the image classifier 120 to behave like a binary classifier even though the image classifier 120 includes the multi-class classifier neural network 122.

The training system 110 can train the neural network 122 using class weights that are different for one or more pairs, e.g., each pair, of predicted class and ground truth class. Predicted class may refer to the class that the neural network 122 classifies for the image, and the ground truth class may refer to the classes specified for images by training data which may be assumed to be always correct. The use of different weight pairs for the predicted class and ground truth class, used to update the neural network 122 using data from a prediction by the neural network 122 in a training iteration, can better correct the neural network 122 for incorrect predictions compared to other systems. In some implementations, the class weights may be in the form of an information gain loss matrix G that specifies classifications differently for pairs, e.g., each pair, of predicted class and ground truth class.

To train the neural network 122, the training system 110 can compute an information gain loss E. The information gain loss E may be computed using equation (1), below.

$$E = -\frac{1}{N}\sum_{n=1}^{N} G_{l_n} \log(p_n) = -\frac{1}{N}\sum_{k=1}^{N}\sum_{k=1}^{K} G_{l_{n,k}} \log(p_{n,k}) \quad (1)$$

In equation (1), G is the information gain matrix, and $G_{l_n}$ denotes row $l_n$ of G that is the weight vector for the ground truth label $l_n$ of the $n^{th}$ image. In a traditional loss function, e.g., multinomial logistic loss, G=Identity is the equivalent. However, to improve training of the neural network 116, the training system 110 can use the information gain matrix G as described in more detail below.

In some implementations, the information gain matrix G can have, for a row $l_n$ for a particular ground truth label, non-negative values that sum to one. For instance, the information gain matrix G can have a row $l_n$ that includes at least one ground truth label that has a non-negative value other than one or zero.

Further, the information gain matrix G can have, for a row $l_n$ that belongs to a particular final classification type, negative values for the locations indexed by the classes in the other final classification type. For instance, the image classifier 114 can have neural network 116 classifications and binary classifier layer 118 final classifications. The final classifications can be object of interest or not an object of interest, e.g., non-object of interest.

$p_n$ is the output vector from the neural network for the $n^{th}$ image that includes, for each class k, a probability that the $n^{th}$ image depicts an object of the corresponding class, and $p_{n,k}$ is the probability value determined by the neural network that the $n^{th}$ image depicts an object of class k. In some examples, the probability values of each output vector $p_n$ from the neural network can sum to one, e.g., the probability values of each output vector $p_n$ can always sum to one.

If an element of G is <0, e.g., is negative, the training system 110 can apply a higher penalty on the loss of the neural network 116 incorrectly predicting a class, compared to logistic loss when the neural network 116 incorrectly predicts a class when an element of G is >=0, e.g., non-negative. The use of negative and non-negative values in the information gain matrix G can enable the training system 110 to train the neural network 116 more quickly than other training systems.

Table 1, below, depicts an example of an information gain loss matrix G. In Table 1, the class weight for a ground truth of Human and a prediction of Background, e.g., G[Human, Bg], is −0.7, thereby giving a high penalty when the neural network 122 classifies an image that depicts a human as a background. The class weight for a ground truth of Background and a prediction of Human, e.g., G[Bg, Human], is −0.1. This penalty for classifying a background sample as Human is more, e.g., instead of a loss of 0, but less than the higher penalty for incorrectly classifying an object of interest, e.g., a human.

The training system 110 can use non-negative class weights for classification pairs for which the output by the binary classifier layer 124 is the same, e.g., to allow some misclassification among non-object classes. For instance, the class weight for a ground truth of Background and a prediction of Spider Web, e.g., G[Bg, Sp], is a positive value: 0.5. Similarly, the class weight for a ground truth of Spider Web and a prediction of Background, e.g., G[Sp, Bg], is 0.5. The class weights for the classification pairs that are all objects of interest, e.g., animal 140, vehicle 142, and human 144, can have non-negative values, e.g., zero.

TABLE 1

Example information gain matrix G, e.g., weights for detection classification.

| Ground Truth Class | Prediction Class | | | | |
|---|---|---|---|---|---|
| | Bg | H | A | C | Sp |
| Background (Bg) | [0.5 | −0.1 | −0.1 | −0.1 | 0.5] |
| Human (H) | [−0.7 | 1.0 | 0.0 | 0.0 | −0.7] |
| Animal (A) | [−0.7 | 0.0 | 1.0 | 0.0 | −0.7] |
| Vehicle (C) | [−0.7 | 0.0 | 0.0 | 1.0 | −0.7] |
| Spider/web (Sp) | [0.5 | −0.1 | −0.1 | −0.1 | 0.5] |

In some examples, the information gain weight $G_{l_n}$ for a ground truth label $l_n$, e.g., which is a vector, the non-negative values in the ground truth label that correspond to the same overall classification, e.g., object of interest or non-object of interest, can sum to one. For instance, for the example shown in table 1 above, both Background (BG) and Spider/web (Sp) are non-objects of interest. In the above information gain matrix G, the ground truth label $G_{Bg}$ for Background includes a value of 0.5 for Bg (background) and a value of 0.5 for Sp (spider/web) and the sum of these two values is one.

Similarly, for the example shown above, human (H), animal (A), and vehicle (C) are all objects of interest. For the ground truth label $G_H$ for Human, there is a value of 1.0 for H and two values of 0.0 for A and C, which sum to one.

In the information gain matrix G, each ground truth vector includes a highest value. The highest value is for the class to which the corresponding vector belongs. For instance, for the ground truth vector $G_{Bg}$, the highest value is 0.5 and is in the location indexed by the prediction class Bg. Although this value can also be in another location, e.g., indexed by prediction class Sp, the highest value is at least in the location indexed by the corresponding class. In another example, for the ground truth vector $G_H$, the highest value of 1.0 is in the location indexed by the prediction class H.

Figure 3:
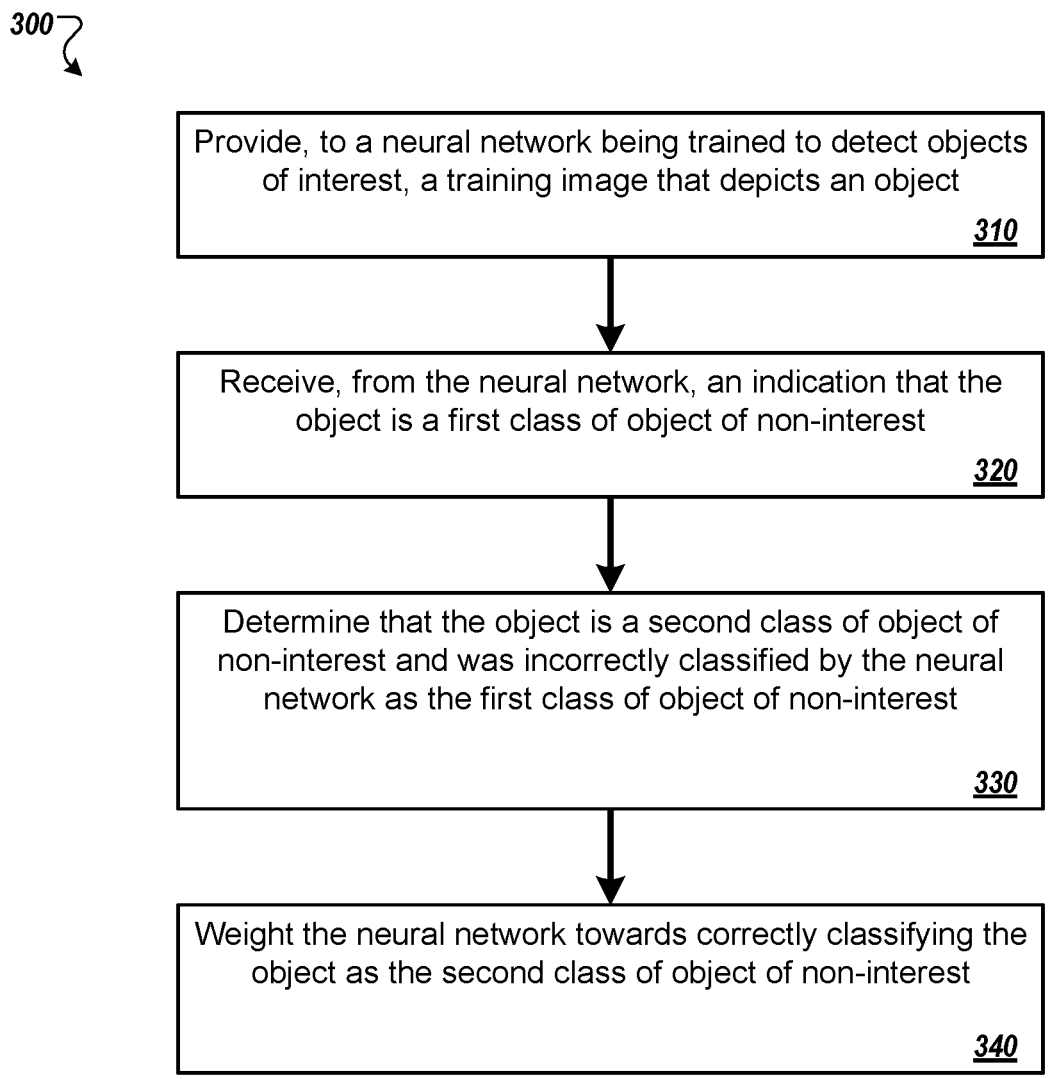
FIG. 3 is a block diagram of an example process for detecting objects.

FIG. 3 is a block diagram of an example process 300 for detecting objects. Briefly, and as will be described in more detail below, the process 300 includes providing a training image that depicts an object to a neural network being trained to detect objects of interest (310), receiving, from the neural network, an indication that the object is a first class of object of non-interest (320), determining that the object is a second class of object of non-interest and was incorrectly classified by the neural network as the first class of object of non-interest (330), and weighting the neural network towards correctly classifying the object as the second class of object of non-interest (340).

The process 300 includes providing, to a neural network being trained to detect objects of interest, a training image that depicts an object (310). For example, the training engine 112 may provide an image of a spider web to the neural network 116 when the neural network 116 is partially trained. The neural network 116 can be partially trained to classify an image into one of the following classes: showing a spider web, showing background, showing an animal, showing a human, or showing a vehicle, where animals, humans, and vehicles are considered objects of interest and background and spider webs are considered objects of non-interest or otherwise not depicting an object of interest.

The process 300 includes receiving, from the neural network, an indication that the object is the first class of object of non-interest (320). For example, the training engine 112 may receive an indication from the neural network 116 that the image of the spider web is classified as showing background. The first class of object of non-interest can be background, e.g., the classification applied to the object by the neural network. The second class of object of non-interest can be spider web, e.g., the ground truth classification that the neural network should have predicted for the object.

The process 300 includes determining that the object is the second class of object of non-interest and was incorrectly classified by the neural network as the first class of object of non-interest (330). For example, the training engine 112 may receive the indication that the image was classified by the neural network 116 as showing background, e.g., the first class of object of non-interest. The training engine 112 can determine from an indication in training data that the ground truth class from the image is spider web, e.g., the second class of object of non-interest. The training engine 112 can determine that the indication of background and ground truth class of spider web do not match, and, in response, determine that the object is the second class of object of non-interest and was incorrectly classified as the first class of object of non-interest.

The process 300 includes weighting the neural network towards correctly classifying the object as the second class of object of non-interest (340). For example, in response to the neural network 116 incorrectly classifying the spider web as background, the training engine 112 may use a class weight value of −0.5 with a loss function that is used to further train the neural network 116. The class weight value used with the loss function reinforces the neural network for future classification of the object, and similar objects, as a spider web instead of as the background.

FIG. 4 is a flow diagram of a process 400 for training an image classifier. For example, the process 400 can be used by the training system 110, the training engine 112, or both, from the environment 100.

A training system provides, to a neural network of an image classifier that is trained to detect objects of the two or more classification types, a feature vector for a respective training image (402). For instance, the training system can generate the feature vector of the respective training image, e.g., using any appropriate feature vector generation process. In some examples, the training system can access a database that includes the feature vector for the training image.

The training system can perform one or more steps in the process, e.g., steps 402 through 408, multiple times. For instance, the training system can perform step 402 for each of multiple different training images. Each of the training images can be associated with a class, e.g., a classification type, from two or more classes, e.g., classification types.

The multiple different training images can include at least one image for each class. For instance, when there are three classes, the multiple different training images can include at least three images, a first image for a first class, a second image for a second class, and a third image for a third class. During a training process, the training system is likely to use data for a larger number of training images, e.g., hundreds or thousands of training images.

The training system receives, from the neural network, an output vector that indicates, for each of the two or more classification types, a likelihood that the respective training image depicts an object of the corresponding classification type (404). The values in the output vector can sum to one. In some examples, the output vector can be a one-hot vector, e.g., that includes only one value of one.

For example, when there are three classification types, the output vector would include three values. When there are five classification types, the output vector would include five values.

The training system accesses, from two or more ground truth vectors each for one of the two or more classification types, a ground truth vector for the classification type of an object depicted in the respective training image (406). Each of the classification types has a corresponding ground truth vector. The ground truth vector can be part of a matrix, e.g., an information gain matrix G. Each vector can be a row in the matrix.

For example, the training system can access, for the training image, the ground truth vector that corresponds to the training image. The ground truth vector can represent the classification type, e.g., the ground truth label, to which the training image belongs. For instance, the training image can depict a spider web and have a ground truth label of "spider web". The training system can use the ground truth label for the training image to access a database and determine the ground truth vector for the training image. Based on table 1, above, the training system can determine a ground truth vector of "[0.5−0.1−0.1−0.1 0.5]" for the training image.

Each ground truth vector can include a value for each of the two or more classification types. For instance, based on the above example, the ground truth vector can have a first value of "0.5" for the classification type "background," a first value of "−0.1" for the classification type "human," a second value of "−0.1" for the classification type "animal," a third value of "−0.1" for the classification type "vehicle," and a second value of "0.5" for the classification type "spider/web".

Each of the two or more classification types can be a primary classification for a secondary or final classification. For instance, each of the classification types can be for a first final classification type of "object of interest" or a second final classification type of "not an object of interest" or "non-object of interest."

A ground truth vector for a particular final classification includes non-negative vector values for the other classification types of the same final classification and negative vector values for the other classification types that have a different final classification. For instance, in the above example for the ground truth vector for background, the ground truth vector includes two non-negative values of "0.5" for the classification types of background and spider/web which all have the same final classification, e.g., not an object of interest. Further, the ground truth vector for background includes three negative values of "−0.1" for the classification types human, animal, and vehicle that all have a different final classification, e.g., object of interest, from the final classification for background, e.g., not an object of interest.

The training system can have three or more classification types. Two of the three or more classification types can be for the same final classification type. Two of the three or more classification types can have a final classification type of not an object of interest, e.g., non-object of interest.

The training system can have five or more classification types. In these examples, the training system can have two classification types with a final classification type of not an object of interest and three classification types with a final classification type of object of interest.

The training system adjusts one or more weights in the neural network using a combination of the output vector and the ground truth vector for the classification type of the objected depicted in the respective training image (408). The training system can use any appropriate process to combine the output vector and the ground truth vector. For instance, the training system can sum the two vectors, multiply the two vectors, divide the two vectors, or subtract one vector from the other. In some examples, the training system can multiply the two vectors and add the weighted output vector to get a training value.

The training system can combine, for each of the values in the ground truth vector, the respective value from the ground truth vector with a corresponding value from the output vector to generate combined values. In some examples, the training system can multiply corresponding values in the output vector by the corresponding values in the ground truth vector.

The training system can use the combined values to generate a training value. For instance, the training system can add all of the combined values to generate the training value. The training value can be the information gain loss E, described in more detail above.

The training system can adjust the one or more weights in the neural network using the training value. The training system can use backward propagation to adjust the one or more weights. In some examples, the training system can use the information gain loss E to adjust the one or more weights in the neural network.

The training system stores, in a memory, the image classifier that includes the neural network for use by a camera to classify objects detected in one or more images captured by the camera (410). The training system can create the image classifier by combining the neural network with a binary classifier layer to generate a binary neural network. The binary neural network is trained to receive a feature vector for an image as input and output a value that indicates a final classification type for the image, e.g., whether an object depicted in the image is an object of interest or is not an object of interest. The binary neural network contrasts with the neural network used during training that can be a multi-class classifier.

The training system can store the image classifier in the memory. For instance, the training system can store the image classifier in a memory of a server, or another computer, for use by a camera to classify objects detected in one or more images captured by the camera.

In some implementations, the training system or another system can provide the image classifier, that includes the neural network and the binary classifier layer, to a camera. The system can provide the image classifier to the camera for use by the camera classifying objects detected in one or more images captured by the camera.

The order of steps in the process 400 described above is illustrative only, and training a model to reduce false camera detections can be performed in different orders. For example, the training system can access the ground truth vector, e.g., perform step 406, and then provide the feature vector, e.g., perform step 402, receive the likelihood, e.g., perform step 404, or both.

In some implementations, the process 400 can include additional steps, fewer steps, or some of the steps can be divided into multiple steps. For example, the process 400 can include steps 402 through 408 without step 410.

In some implementations, the training system can determine whether to add an additional class, e.g., classification type. For instance, the training system can include two sets of labeled training data, e.g., training images, training vectors, or both. The training system can use a first set from the two sets to train the neural network. The training system can use a second set from the two sets to test an accuracy of the neural network.

When the training system determines that the accuracy of the neural network satisfies an accuracy threshold, the training system can determine to stop training the neural network and store the neural network in memory. For instance, the training system can combine the neural network with the binary classification layer to create the image classifier and store the image classifier in memory.

When the training system determines that the accuracy of the neural network does not satisfy the accuracy threshold, the training system can determine whether to create a new classification type for the neural network. For example, the training system can determine whether the neural network had at least a threshold false positive rate for background images, one of the classification types for objects of interest, or both.

If so, the training system can determine whether an amount of the training images that the neural network incorrectly classified that are of the same type, e.g., are all of another classification type for which the neural network was not separately trained, satisfies a threshold amount. The training system can make this determination using detailed labels for training images, which labels are stored in a database. The training system can make this determination using input from an administrator. The training system can use any appropriate process to make this determination.

When the training system determines that the amount of training images that the neural network incorrectly classified that are of the same type satisfies the threshold amount, e.g., quantity or percentage, the training system can determine to create another classification type depending on what is depicted in incorrectly classified images of the same type. The new classification type can be for water, plants, or boats (on a trailer). This can include the training system creating a ground truth vector for the new classification type. The training system can update one or more existing ground truth vectors to include data, e.g., a value, for the new classification type. The training system can update an information gain matrix to include data for the new classification type. The training system can update the binary classification layer to output a particular final classification, e.g., not an object of interest or object of interest, for outputs from the neural network that have a highest value for the new classification type.

When the accuracy of the neural network satisfies the accuracy threshold or that the amount of training images that the neural network incorrectly classified that are of the same type does not satisfy the threshold amount, the training system can determine to skip adding a new classification type to the neural network. For instance, the training system can determine to stop training and store the neural network in memory. The training system can create the image classifier using the neural network.

The training system can determine one or more values for the ground truth vector for the new classification type using a quantity of training images for the new classification type. For instance, when the new classification type is for another object of interest, the new classification type can determine a ground truth value for the background index using the quantity of training images. When the quantity of training images does not satisfy a quantity threshold, the training system can select a more negative, e.g., further from zero, value than the training system would select had the training system determined that the quantity of training images satisfied the quantity threshold.

In some examples, the absolute values for the ground truth vectors can be between zero and one, inclusive. For instance, the values can include 0.0, 0.1, 0.2, 0.5, and 1.0.

In some implementations, when a camera uses the image classifier, the image classifier is one of multiple analysis processes used. For instance, the camera can first use a motion detector to determine whether there is motion in the camera's field of view. If so, the camera can analyze one or more images of an area in which motion was detected using the image classifier. When the camera determines that the analyzed image do not depict an object of interest, the camera can stop its analysis based on the detected motion.

When the camera determines that the analyzed image depicts an object of interest using the image classifier, the camera can send a message to the monitoring server. The message can include the one or more images, other data about the detected motion, or both. The other data can include a time of day, location on a property, or both. The monitoring server can then analyze the received data and determine an action to perform, such as turning on a light.

Figure 5:
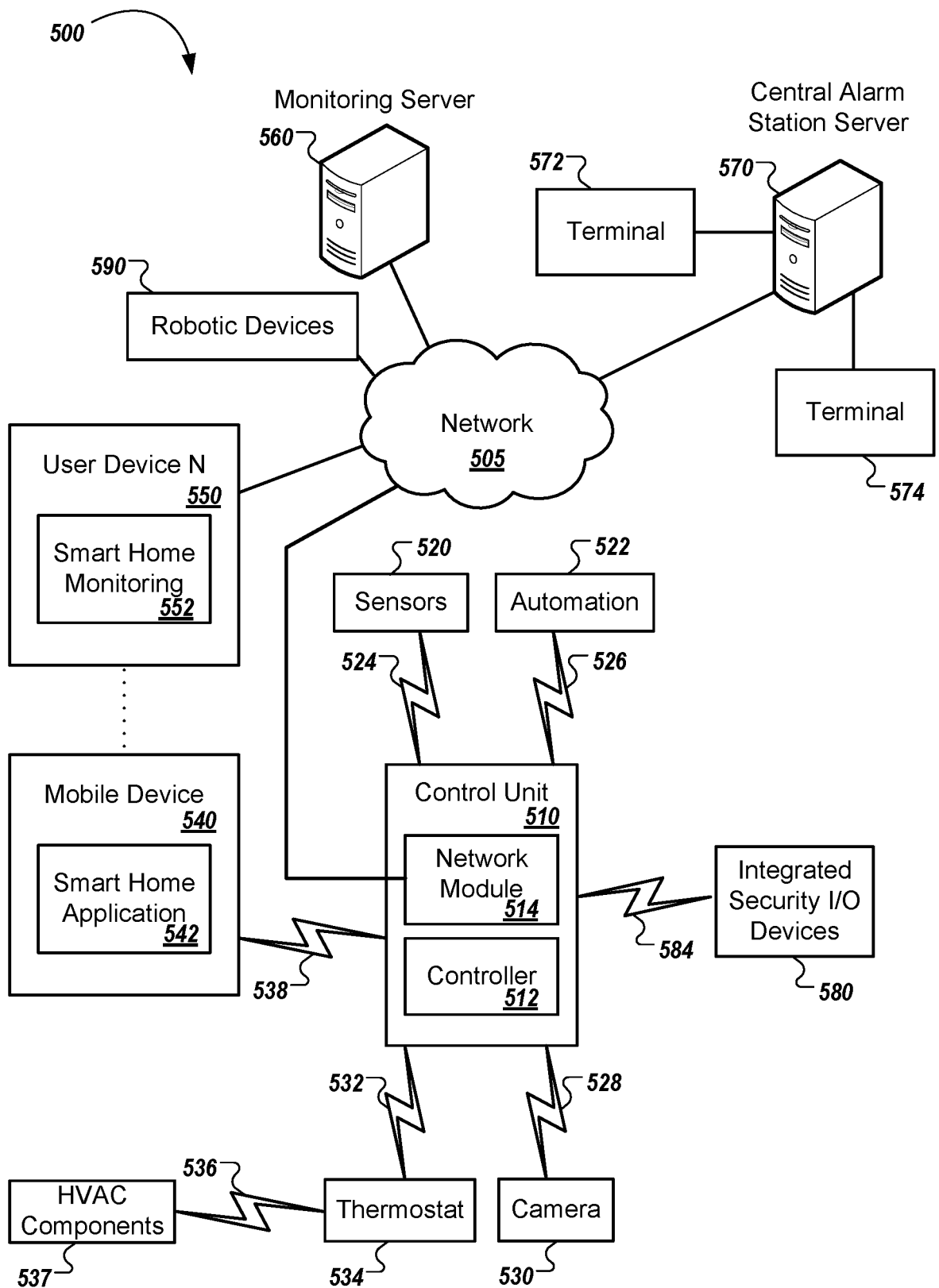
FIG. 5 is a block diagram illustrating an example of a home monitoring system.

FIG. 5 is a diagram illustrating an example of a home monitoring system 500. The home monitoring system 500 includes a network 505, a control unit 510, one or more user devices 540 and 550, a monitoring server 560, and a central alarm station server 570. In some examples, the network 505 facilitates communications between the control unit 510, the one or more user devices 540 and 550, the monitoring server 560, and the central alarm station server 570.

The network 505 is configured to enable exchange of electronic communications between devices connected to the network 505. For example, the network 505 may be configured to enable exchange of electronic communications between the control unit 510, the one or more user devices 540 and 550, the monitoring server 560, and the central alarm station server 570. The network 505 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 505 may include multiple networks or subnetworks, each of which may include, for example, a wired or wireless data pathway. The network 505 may include a circuit-switched network, a packet-switched data network, or any other network able to carry electronic communications (e.g., data or voice communications). For example, the network 505 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 505 may include one or more networks that include wireless data channels and wireless voice channels. The network 505 may be a wireless network, a broadband network, or a combination of networks including a wireless network and a broadband network.

The control unit 510 includes a controller 512 and a network module 514. The controller 512 is configured to control a control unit monitoring system (e.g., a control unit system) that includes the control unit 510. In some examples, the controller 512 may include a processor or other control circuitry configured to execute instructions of a program that controls operation of a control unit system. In these examples, the controller 512 may be configured to receive input from sensors, flow meters, or other devices included in the control unit system and control operations of devices included in the household (e.g., speakers, lights, doors, etc.). For example, the controller 512 may be configured to control operation of the network module 514 included in the control unit 510.

The network module 514 is a communication device configured to exchange communications over the network 505. The network module 514 may be a wireless communication module configured to exchange wireless communications over the network 505. For example, the network module 514 may be a wireless communication device configured to exchange communications over a wireless data channel and a wireless voice channel. In this example, the network module 514 may transmit alarm data over a wireless data channel and establish a two-way voice communication session over a wireless voice channel. The wireless communication device may include one or more of a LTE module, a GSM module, a radio modem, a cellular transmission module, or any type of module configured to exchange communications in one of the following formats: LTE, GSM or GPRS, CDMA, EDGE or EGPRS, EV-DO or EVDO, UMTS, or IP.

The network module 514 also may be a wired communication module configured to exchange communications over the network 505 using a wired connection. For instance, the network module 514 may be a modem, a network interface card, or another type of network interface device. The network module 514 may be an Ethernet network card configured to enable the control unit 510 to communicate over a local area network and/or the Internet. The network module 514 also may be a voice band modem configured to enable the alarm panel to communicate over the telephone lines of Plain Old Telephone Systems (POTS).

The control unit system that includes the control unit 510 includes one or more sensors. For example, the monitoring system 500 may include multiple sensors 520. The sensors 520 may include a lock sensor, a contact sensor, a motion sensor, or any other type of sensor included in a control unit system. The sensors 520 also may include an environmental sensor, such as a temperature sensor, a water sensor, a rain sensor, a wind sensor, a light sensor, a smoke detector, a carbon monoxide detector, an air quality sensor, etc. The sensors 520 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health monitoring sensor can be a wearable sensor that attaches to a user in the home. The health monitoring sensor can collect various health data, including pulse, heart-rate, respiration rate, sugar or glucose level, bodily temperature, or motion data. The sensors 520 can also include a radio-frequency identification (RFID) sensor that identifies a particular article that includes a pre-assigned RFID tag.

The control unit 510 communicates with the home automation controls 522 and a camera 530 to perform monitoring. The home automation controls 522 are connected to one or more devices that enable automation of actions in the home. For instance, the home automation controls 522 may be connected to one or more lighting systems and may be configured to control operation of the one or more lighting systems. Also, the home automation controls 522 may be connected to one or more electronic locks at the home and may be configured to control operation of the one or more electronic locks (e.g., control Z-Wave locks using wireless communications in the Z-Wave protocol). Further, the home automation controls 522 may be connected to one or more appliances at the home and may be configured to control operation of the one or more appliances. The home automation controls 522 may include multiple modules that are each specific to the type of device being controlled in an automated manner. The home automation controls 522 may control the one or more devices based on commands received from the control unit 510. For instance, the home automation controls 522 may cause a lighting system to illuminate an area to provide a better image of the area when captured by a camera 530.

The camera 530 may be a video/photographic camera or other type of optical sensing device configured to capture images. For instance, the camera 530 may be configured to capture images of an area within a building or home monitored by the control unit 510. The camera 530 may be configured to capture single, static images of the area or video images of the area in which multiple images of the area are captured at a relatively high frequency (e.g., thirty images per second) or both. The camera 530 may be controlled based on commands received from the control unit 510.

The camera 530 may be triggered by several different types of techniques. For instance, a Passive Infra-Red (PIR) motion sensor may be built into the camera 530 and used to trigger the camera 530 to capture one or more images when motion is detected. The camera 530 also may include a microwave motion sensor built into the camera and used to trigger the camera 530 to capture one or more images when motion is detected. The camera 530 may have a "normally open" or "normally closed" digital input that can trigger capture of one or more images when external sensors (e.g., the sensors 520, PIR, door/window, etc.) detect motion or other events. In some implementations, the camera 530 receives a command to capture an image when external devices detect motion or another potential alarm event. The camera 530 may receive the command from the controller 512 or directly from one of the sensors 520.

In some examples, the camera 530 triggers integrated or external illuminators (e.g., Infra-Red, Z-wave controlled "white" lights, lights controlled by the home automation controls 522, etc.) to improve image quality when the scene is dark. An integrated or separate light sensor may be used to determine if illumination is desired and may result in increased image quality.

The camera 530 may be programmed with any combination of time/day schedules, system "arming state", or other variables to determine whether images should be captured or not when triggers occur. The camera 530 may enter a low-power mode when not capturing images. In this case, the camera 530 may wake periodically to check for inbound messages from the controller 512. The camera 530 may be powered by internal, replaceable batteries, e.g., if located remotely from the control unit 510. The camera 530 may employ a small solar cell to recharge the battery when light is available. The camera 530 may be powered by the controller's 512 power supply if the camera 530 is co-located with the controller 512.

In some implementations, the camera 530 communicates directly with the monitoring server 560 over the Internet. In these implementations, image data captured by the camera 530 does not pass through the control unit 510 and the camera 530 receives commands related to operation from the monitoring server 560.

The system 500 also includes thermostat 534 to perform dynamic environmental control at the home. The thermostat 534 is configured to monitor temperature and/or energy consumption of an HVAC system associated with the thermostat 534, and is further configured to provide control of environmental (e.g., temperature) settings. In some implementations, the thermostat 534 can additionally or alternatively receive data relating to activity at a home and/or environmental data at a home, e.g., at various locations indoors and outdoors at the home. The thermostat 534 can directly measure energy consumption of the HVAC system associated with the thermostat, or can estimate energy consumption of the HVAC system associated with the thermostat 534, for example, based on detected usage of one or more components of the HVAC system associated with the thermostat 534. The thermostat 534 can communicate temperature and/or energy monitoring information to or from the control unit 510 and can control the environmental (e.g., temperature) settings based on commands received from the control unit 510.

In some implementations, the thermostat 534 is a dynamically programmable thermostat and can be integrated with the control unit 510. For example, the dynamically programmable thermostat 534 can include the control unit 510, e.g., as an internal component to the dynamically programmable thermostat 534. In addition, the control unit 510 can be a gateway device that communicates with the dynamically programmable thermostat 534. In some implementations, the thermostat 534 is controlled via one or more home automation controls 522.

A module 537 is connected to one or more components of an HVAC system associated with a home, and is configured to control operation of the one or more components of the HVAC system. In some implementations, the module 537 is also configured to monitor energy consumption of the HVAC system components, for example, by directly measuring the energy consumption of the HVAC system components or by estimating the energy usage of the one or more HVAC system components based on detecting usage of components of the HVAC system. The module 537 can communicate energy monitoring information and the state of the HVAC system components to the thermostat 534 and can control the one or more components of the HVAC system based on commands received from the thermostat 534.

In some examples, the system 500 further includes one or more robotic devices 590. The robotic devices 590 may be any type of robots that are capable of moving and taking actions that assist in home monitoring. For example, the robotic devices 590 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and also roll along the ground, walls, or ceiling) and land vehicle type devices (e.g., automated cars that drive around a home). In some cases, the robotic devices 590 may be robotic devices 590 that are intended for other purposes and merely associated with the system 500 for use in appropriate circumstances. For instance, a robotic vacuum cleaner device may be associated with the monitoring system 500 as one of the robotic devices 590 and may be controlled to take action responsive to monitoring system events.

In some examples, the robotic devices 590 automatically navigate within a home. In these examples, the robotic devices 590 include sensors and control processors that guide movement of the robotic devices 590 within the home. For instance, the robotic devices 590 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 590 may include control processors that process output from the various sensors and control the robotic devices 590 to move along a path that reaches the desired destination and avoids obstacles. In this regard, the control processors detect walls or other obstacles in the home and guide movement of the robotic devices 590 in a manner that avoids the walls and other obstacles.

In addition, the robotic devices 590 may store data that describes attributes of the home. For instance, the robotic devices 590 may store a floorplan and/or a three-dimensional model of the home that enables the robotic devices 590 to navigate the home. During initial configuration, the robotic devices 590 may receive the data describing attributes of the home, determine a frame of reference to the data (e.g., a home or reference location in the home), and navigate the home based on the frame of reference and the data describing attributes of the home. Further, initial configuration of the robotic devices 590 also may include learning of one or more navigation patterns in which a user provides input to control the robotic devices 590 to perform a specific navigation action (e.g., fly to an upstairs bedroom and spin around while capturing video and then return to a home charging base). In this regard, the robotic devices 590 may learn and store the navigation patterns such that the robotic devices 590 may automatically repeat the specific navigation actions upon a later request.

In some examples, the robotic devices 590 may include data capture and recording devices. In these examples, the robotic devices 590 may include one or more cameras, one or more motion sensors, one or more microphones, one or more biometric data collection tools, one or more temperature sensors, one or more humidity sensors, one or more air flow sensors, and/or any other types of sensor that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 590 to take and store a biometric sample that can be used to identify the person (e.g., a biometric sample with DNA that can be used for DNA testing).

In some implementations, the robotic devices 590 may include output devices. In these implementations, the robotic devices 590 may include one or more displays, one or more speakers, and/or any type of output devices that allow the robotic devices 590 to communicate information to a nearby user.

The robotic devices 590 also may include a communication module that enables the robotic devices 590 to communicate with the control unit 510, each other, and/or other devices. The communication module may be a wireless communication module that allows the robotic devices 590 to communicate wirelessly. For instance, the communication module may be a Wi-Fi module that enables the robotic devices 590 to communicate over a local wireless network at the home. The communication module further may be a 900 MHz wireless communication module that enables the robotic devices 590 to communicate directly with the control unit 510. Other types of short-range wireless communication protocols, such as Bluetooth, Bluetooth LE, Z-wave, Zigbee, etc., may be used to allow the robotic devices 590 to communicate with other devices in the home. In some implementations, the robotic devices 590 may communicate with each other or with other devices of the system 500 through the network 505.

The robotic devices 590 further may include processor and storage capabilities. The robotic devices 590 may include any suitable processing devices that enable the robotic devices 590 to operate applications and perform the actions described throughout this disclosure. In addition, the robotic devices 590 may include solid-state electronic storage that enables the robotic devices 590 to store applications, configuration data, collected sensor data, and/or any other type of information available to the robotic devices 590.

The robotic devices 590 are associated with one or more charging stations. The charging stations may be located at predefined home base or reference locations in the home. The robotic devices 590 may be configured to navigate to the charging stations after completion of tasks needed to be performed for the home monitoring system 500. For instance, after completion of a monitoring operation or upon instruction by the control unit 510, the robotic devices 590 may be configured to automatically fly to and land on one of the charging stations. In this regard, the robotic devices 590 may automatically maintain a fully charged battery in a state in which the robotic devices 590 are ready for use by the home monitoring system 500.

The charging stations may be contact based charging stations and/or wireless charging stations. For contact based charging stations, the robotic devices 590 may have readily accessible points of contact that the robotic devices 590 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 590 may charge through a wireless exchange of power. In these cases, the robotic devices 590 need only locate themselves closely enough to the wireless charging stations for the wireless exchange of power to occur. In this regard, the positioning needed to land at a predefined home base or reference location in the home may be less precise than with a contact based charging station. Based on the robotic devices 590 landing at a wireless charging station, the wireless charging station outputs a wireless signal that the robotic devices 590 receive and convert to a power signal that charges a battery maintained on the robotic devices 590.

In some implementations, each of the robotic devices 590 has a corresponding and assigned charging station such that the number of robotic devices 590 equals the number of charging stations. In these implementations, the robotic devices 590 always navigate to the specific charging station assigned to that robotic device. For instance, a first robotic device may always use a first charging station and a second robotic device may always use a second charging station.

In some examples, the robotic devices 590 may share charging stations. For instance, the robotic devices 590 may use one or more community charging stations that are capable of charging multiple robotic devices 590. The community charging station may be configured to charge multiple robotic devices 590 in parallel. The community charging station may be configured to charge multiple robotic devices 590 in serial such that the multiple robotic devices 590 take turns charging and, when fully charged, return to a predefined home base or reference location in the home that is not associated with a charger. The number of community charging stations may be less than the number of robotic devices 590.

Also, the charging stations may not be assigned to specific robotic devices 590 and may be capable of charging any of the robotic devices 590. In this regard, the robotic devices 590 may use any suitable, unoccupied charging station when not in use. For instance, when one of the robotic devices 590 has completed an operation or is in need of battery charge, the control unit 510 references a stored table of the occupancy status of each charging station and instructs the robotic device to navigate to the nearest charging station that is unoccupied.

The system 500 further includes one or more integrated security devices 580. The one or more integrated security devices may include any type of device used to provide alerts based on received sensor data. For instance, the one or more control units 510 may provide one or more alerts to the one or more integrated security input/output devices 580. Additionally, the one or more control units 510 may receive sensor data from the sensors 520 and determine whether to provide an alert to the one or more integrated security input/output devices 580.

The sensors 520, the home automation controls 522, the camera 530, the thermostat 534, and the integrated security devices 580 may communicate with the controller 512 over communication links 524, 526, 528, 532, 538, and 584. The communication links 524, 526, 528, 532, 538, and 584 may be a wired or wireless data pathway configured to transmit signals from the sensors 520, the home automation controls 522, the camera 530, the thermostat 534, and the integrated security devices 580 to the controller 512. The sensors 520, the home automation controls 522, the camera 530, the thermostat 534, and the integrated security devices 580 may continuously transmit sensed values to the controller 512, periodically transmit sensed values to the controller 512, or transmit sensed values to the controller 512 in response to a change in a sensed value.

The communication links 524, 526, 528, 532, 538, and 584 may include a local network. The sensors 520, the home automation controls 522, the camera 530, the thermostat 534, and the integrated security devices 580, and the controller 512 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 560 is an electronic device configured to provide monitoring services by exchanging electronic communications with the control unit 510, the one or more user devices 540 and 550, and the central alarm station server 570 over the network 505. For example, the monitoring server 560 may be configured to monitor events (e.g., alarm events) generated by the control unit 510. In this example, the monitoring server 560 may exchange electronic communications with the network module 514 included in the control unit 510 to receive information regarding events (e.g., alerts) detected by the control unit 510. The monitoring server 560 also may receive information regarding events (e.g., alerts) from the one or more user devices 540 and 550.

In some examples, the monitoring server 560 may route alert data received from the network module 514 or the one or more user devices 540 and 550 to the central alarm station server 570. For example, the monitoring server 560 may transmit the alert data to the central alarm station server 570 over the network 505.

The monitoring server 560 may store sensor and image data received from the monitoring system 500 and perform analysis of sensor and image data received from the monitoring system 500. Based on the analysis, the monitoring server 560 may communicate with and control aspects of the control unit 510 or the one or more user devices 540 and 550.

The monitoring server 560 may provide various monitoring services to the system 500. For example, the monitoring server 560 may analyze the sensor, image, and other data to determine an activity pattern of a resident of the home monitored by the system 500. In some implementations, the monitoring server 560 may analyze the data for alarm conditions or may determine and perform actions at the home by issuing commands to one or more of the controls 522, possibly through the control unit 510.

The central alarm station server 570 is an electronic device configured to provide alarm monitoring service by exchanging communications with the control unit 510, the one or more mobile devices 540 and 550, and the monitoring server 560 over the network 505. For example, the central alarm station server 570 may be configured to monitor alerting events generated by the control unit 510. In this example, the central alarm station server 570 may exchange communications with the network module 514 included in the control unit 510 to receive information regarding alerting events detected by the control unit 510. The central alarm station server 570 also may receive information regarding alerting events from the one or more mobile devices 540 and 550 and/or the monitoring server 560.

The central alarm station server 570 is connected to multiple terminals 572 and 574. The terminals 572 and 574 may be used by operators to process alerting events. For example, the central alarm station server 570 may route alerting data to the terminals 572 and 574 to enable an operator to process the alerting data. The terminals 572 and 574 may include general-purpose computers (e.g., desktop personal computers, workstations, or laptop computers) that are configured to receive alerting data from a server in the central alarm station server 570 and render a display of information based on the alerting data. For instance, the controller 512 may control the network module 514 to transmit, to the central alarm station server 570, alerting data indicating that a sensor 520 detected motion from a motion sensor via the sensors 520. The central alarm station server 570 may receive the alerting data and route the alerting data to the terminal 572 for processing by an operator associated with the terminal 572. The terminal 572 may render a display to the operator that includes information associated with the alerting event (e.g., the lock sensor data, the motion sensor data, the contact sensor data, etc.) and the operator may handle the alerting event based on the displayed information.

In some implementations, the terminals 572 and 574 may be mobile devices or devices designed for a specific function. Although FIG. 5 illustrates two terminals for brevity, actual implementations may include more (and, perhaps, many more) terminals.

The one or more authorized user devices 540 and 550 are devices that host and display user interfaces. For instance, the user device 540 is a mobile device that hosts or runs one or more native applications (e.g., the smart home application 542). The user device 540 may be a cellular phone or a non-cellular locally networked device with a display. The user device 540 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 540 may perform functions unrelated to the monitoring system, such as placing personal telephone calls, playing music, playing video, displaying pictures, browsing the Internet, maintaining an electronic calendar, etc.

The user device 540 includes a smart home application 542. The smart home application 542 refers to a software/firmware program running on the corresponding mobile device that enables the user interface and features described throughout. The user device 540 may load or install the smart home application 542 based on data received over a network or data received from local media. The smart home application 542 runs on mobile devices platforms, such as iPhone, iPod touch, Blackberry, Google Android, Windows Mobile, etc. The smart home application 542 enables the user device 540 to receive and process image and sensor data from the monitoring system.

The user device 550 may be a general-purpose computer (e.g., a desktop personal computer, a workstation, or a laptop computer) that is configured to communicate with the monitoring server 560 and/or the control unit 510 over the network 505. The user device 550 may be configured to display a smart home user interface 552 that is generated by the user device 550 or generated by the monitoring server 560. For example, the user device 550 may be configured to display a user interface (e.g., a web page) provided by the monitoring server 560 that enables a user to perceive images captured by the camera 530 and/or reports related to the monitoring system. Although FIG. 5 illustrates two user devices for brevity, actual implementations may include more (and, perhaps, many more) or fewer user devices.

In some implementations, the one or more user devices 540 and 550 communicate with and receive monitoring system data from the control unit 510 using the communication link 538. For instance, the one or more user devices 540 and 550 may communicate with the control unit 510 using various local wireless protocols such as Wi-Fi, Bluetooth, Z-wave, Zigbee, HomePlug (ethernet over power line), or wired protocols such as Ethernet and USB, to connect the one or more user devices 540 and 550 to local security and automation equipment. The one or more user devices 540 and 550 may connect locally to the monitoring system and its sensors and other devices. The local connection may improve the speed of status and control communications because communicating through the network 505 with a remote server (e.g., the monitoring server 560) may be significantly slower.

Although the one or more user devices 540 and 550 are shown as communicating with the control unit 510, the one or more user devices 540 and 550 may communicate directly with the sensors and other devices controlled by the control unit 510. In some implementations, the one or more user devices 540 and 550 replace the control unit 510 and perform the functions of the control unit 510 for local monitoring and long range/offsite communication.

In other implementations, the one or more user devices 540 and 550 receive monitoring system data captured by the control unit 510 through the network 505. The one or more user devices 540, 550 may receive the data from the control unit 510 through the network 505 or the monitoring server 560 may relay data received from the control unit 510 to the one or more user devices 540 and 550 through the network 505. In this regard, the monitoring server 560 may facilitate communication between the one or more user devices 540 and 550 and the monitoring system.

In some implementations, the one or more user devices 540 and 550 may be configured to switch whether the one or more user devices 540 and 550 communicate with the control unit 510 directly (e.g., through link 538) or through the monitoring server 560 (e.g., through network 505) based on a location of the one or more user devices 540 and 550. For instance, when the one or more user devices 540 and 550 are located close to the control unit 510 and in range to communicate directly with the control unit 510, the one or more user devices 540 and 550 use direct communication. When the one or more user devices 540 and 550 are located far from the control unit 510 and not in range to communicate directly with the control unit 510, the one or more user devices 540 and 550 use communication through the monitoring server 560.

Although the one or more user devices 540 and 550 are shown as being connected to the network 505, in some implementations, the one or more user devices 540 and 550 are not connected to the network 505. In these implementations, the one or more user devices 540 and 550 communicate directly with one or more of the monitoring system components and no network (e.g., Internet) connection or reliance on remote servers is needed.

In some implementations, the system 500 provides end users with access to images captured by the camera 530 to aid in decision-making. The system 500 may transmit the images captured by the camera 530 over a wireless WAN network to the user devices 540 and 550. Because transmission over a wireless WAN network may be relatively expensive, the system 500 can use several techniques to reduce costs while providing access to significant levels of useful visual information (e.g., compressing data, down-sampling data, sending data only over inexpensive LAN connections, or other techniques).

In some implementations, a state of the monitoring system 500 and other events sensed by the monitoring system 500 may be used to enable/disable video/image recording devices (e.g., the camera 530). In these implementations, the camera 530 may be set to capture images on a periodic basis when the alarm system is armed in an "away" state, but set not to capture images when the alarm system is armed in a "home" state or disarmed. In addition, the camera 530 may be triggered to begin capturing images when the alarm system detects an event, such as an alarm event, a door-opening event for a door that leads to an area within a field of view of the camera 530, or motion in the area within the field of view of the camera 530. In other implementations, the camera 530 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A computer-implemented method comprising:
for each of a plurality of training images each of which are associated with a classification type from two or more classification types, the plurality of training images including at least one image for each of the two or more classification types:
providing, to a neural network of an image classifier that is trained to detect objects of the two or more classification types, a feature vector for the respective training image;
receiving, from the neural network, an output vector that indicates, for each of the two or more classification types, a likelihood that the respective training image depicts an object of the corresponding classification type;
accessing, from two or more ground truth vectors each for one of the two or more classification types, a ground truth vector for the classification type of an object depicted in the respective training image, wherein a first ground truth vector from the two or more ground truth vectors is different than a second ground truth vector from the two or more ground truth vectors. at least one ground truth vector from the two or more ground truth vectors corresponds to two training images from the plurality of training images, and both of the two training images have the same classification type;
computing a combination of the output vector and the ground truth vector for the classification type of the objected depicted in the respective training image; and
adjusting one or more weights in the neural network using the combination of the output vector and the ground truth vector for the classification type of the objected depicted in the respective training image; and
storing, in a memory, the image classifier that includes the neural network for use by a camera to classify objects detected in one or more images captured by the camera.

2. The method of claim 1, wherein a ground truth vector for an image represents a ground truth label for the image.

3. The method of claim 1, wherein each ground truth vector comprises a value for each of the two or more classification types.

4. The method of claim 3, wherein each ground truth vector comprises a highest value for the classification type from the two or more classification types of the object depicted in a corresponding image.

5. The method of claim 3, wherein:
the output has a first dimension that is the same as a second dimension for the ground truth vector; and
adjusting the one or more weights in the neural network comprises:
combining, for each of the values in the ground truth vector, the respective value from the ground truth vector with a corresponding value from the output vector to generate combined values;
generating a training value using the combined values; and
adjusting the one or more weights in the neural network using the training value.

6. The method of claim 3, wherein:
each of the two or more classification types is a classification for either an object of interest or not an object of interest; and
a ground truth vector from the two or more ground truth vectors comprises i) two or more non-negative values each of which are less than one and the sum of which equals one, each of the two or more non-negative values corresponding to a respective one of the two or more classification types, and ii) a negative value for a different classification type from the two or more classification types.

7. The method of claim 6, wherein each of the two or more non-negative values in the ground truth vector are the same value.

8. The method of claim 1, wherein storing, in a memory, the image classifier comprises:
combining the neural network with a binary classifier layer to generate a binary neural network trained to receive a feature vector for an image as input and output a value that indicates whether an object depicted in the image is an object of interest or is not an object of interest; and
storing, in a memory, the image classifier that includes the binary neural network for use by a camera to classify objects detected in one or more images captured by the camera.

9. The method of claim 1, comprising providing the image classifier to a camera for use by the camera classifying objects detected in one or more images captured by the camera.

10. The method of claim 9, wherein:
at least some training images from the plurality of training images comprise images captured in a low light environment; and
providing the image classifier to the camera comprises providing, to an infrared camera, an infrared image classifier that includes the neural network trained using the images captured in the low light environment.

11. The method of claim 1, wherein accessing the ground truth vector comprises accessing, from three or more ground truth vectors each for one of three or more classification types, the ground truth vector for the classification type of an object depicted in the respective training image.

12. The method of claim 11, wherein:
the three or more classification types comprise five classification types including a background classification, a spider web classification, a human classification, an animal classification, and a vehicle classification; and
accessing the ground truth vector comprises accessing, from five ground truth vectors each for one of the five classification types, the ground truth vector for the classification type of an object depicted in the respective training image.

13. A system comprising one or more computers and one or more storage devices on which are stored instructions that are operable, when executed by the one or more computers, to cause the one or more computers to perform operations comprising:
for each of a plurality of training images each of which are associated with a classification type from two or more classification types, the plurality of training images including at least one image for each of the two or more classification types:
providing, to a neural network of an image classifier that is trained to detect objects of the two or more classification types, a feature vector for the respective training image;
receiving, from the neural network, an output vector that indicates, for each of the two or more classification types, a likelihood that the respective training image depicts an object of the corresponding classification type;
accessing, from two or more ground truth vectors each for one of the two or more classification types, a ground truth vector for the classification type of an object depicted in the respective training image, wherein a first ground truth vector from the two or more ground truth vectors is different than a second ground truth vector from the two or more ground truth vectors, at least one ground truth vector from the two or more ground truth vectors corresponds to two training images from the plurality of training images, and both of the two training images have the same classification type;
computing a combination of the output vector and the ground truth vector for the classification type of the objected depicted in the respective training image; and
adjusting one or more weights in the neural network using the combination of the output vector and the ground truth vector for the classification type of the objected depicted in the respective training image; and
storing, in a memory, the image classifier that includes the neural network for use by a camera to classify objects detected in one or more images captured by the camera.

14. The system of claim 13, wherein a ground truth vector for an image represents a ground truth label for the image.

15. The system of claim 13, wherein each ground truth vector comprises a value for each of the two or more classification types.

16. The system of claim 15, wherein each ground truth vector comprises a highest value for the classification type from the two or more classification types of the object depicted in a corresponding image.

17. The system of claim 15, wherein:
the output has a first dimension that is the same as a second dimension for the ground truth vector; and
adjusting the one or more weights in the neural network comprises:
combining, for each of the values in the ground truth vector, the respective value from the ground truth vector with a corresponding value from the output vector to generate combined values;
generating a training value using the combined values; and
adjusting the one or more weights in the neural network using the training value.

18. The system of claim 15, wherein:
each of the two or more classification types is a classification for either an object of interest or not an object of interest; and
a ground truth vector from the two or more ground truth vectors comprises i) two or more non-negative values each of which are less than one and the sum of which equals one, each of the two or more non-negative values corresponding to a respective one of the two or more classification types, and ii) a negative value for a different classification type from the two or more classification types.

19. The system of claim 18, wherein each of the two or more non-negative values in the ground truth vector are the same value.

20. The system of claim 13, wherein storing, in a memory, the image classifier comprises:
combining the neural network with a binary classifier layer to generate a binary neural network trained to receive a feature vector for an image as input and output a value that indicates whether an object depicted in the image is an object of interest or is not an object of interest; and
storing, in a memory, the image classifier that includes the binary neural network for use by a camera to classify objects detected in one or more images captured by the camera.

21. A non-transitory computer storage medium encoded with instructions that, when executed by one or more computers, cause the one or more computers to perform operations comprising:

for each of a plurality of training images each of which are associated with a classification type from two or more classification types, the plurality of training images including at least one image for each of the two or more classification types:

providing, to a neural network of an image classifier that is trained to detect objects of the two or more classification types, a feature vector for the respective training image;

receiving, from the neural network, an output vector that indicates, for each of the two or more classification types, a likelihood that the respective training image depicts an object of the corresponding classification type;

accessing, from two or more ground truth vectors each for one of the two or more classification types, a ground truth vector for the classification type of an object depicted in the respective training image, wherein:

the two or more classification types comprise five classification types including a background classification, a spider web classification, a human classification, an animal classification, and a vehicle classification; and accessing the ground truth vector comprises accessing, from five ground truth vectors each for one of the five classification types, the ground truth vector for the classification type of an object depicted in the respective training image; and adjusting one or more weights in the neural network using a combination of the output vector and the ground truth vector for the classification type of the objected depicted in the respective training image; and storing, in a memory, the image classifier that includes the neural network for use by a camera to classify objects detected in one or more images captured by the camera.

\* \* \* \* \*

UNITED STATES PATENT AND TRADEMARK OFFICE
CERTIFICATE OF CORRECTION

PATENT NO. : 12,248,535 B2  
APPLICATION NO. : 17/472800  
DATED : March 11, 2025  
INVENTOR(S) : Sravanthi Bondugula et al.

Page 1 of 1

It is certified that error appears in the above-identified patent and that said Letters Patent is hereby corrected as shown below:

On the Title Page

Column 2, item (56) References Cited, Other Publications, Line 1, please delete ""caffe:: InfogainLossLayer" and insert therefor -- "caffe::InfogainLossLayer -- and In the Claims Column 24, Line 13, Claim 1, please delete "vectors." and insert therefor -- vectors, --

Signed and Sealed this  
Seventeenth Day of June, 2025

Coke Morgan Stewart  
*Acting Director of the United States Patent and Trademark Office*